(12) United States Patent
Anantharangachar

(10) Patent No.: US 11,416,216 B2
(45) Date of Patent: Aug. 16, 2022

(54) SEMANTIC CONSOLIDATION OF DATA

(71) Applicant: LONGSAND LIMITED, Cambridge (GB)

(72) Inventor: Raghu Anantharangachar, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 479 days.

(21) Appl. No.: 15/574,352

(22) PCT Filed: Sep. 17, 2015

(86) PCT No.: PCT/EP2015/071374
§ 371 (c)(1),
(2) Date: Nov. 15, 2017

(87) PCT Pub. No.: WO2016/188591
PCT Pub. Date: Dec. 1, 2016

(65) Prior Publication Data
US 2018/0129472 A1     May 10, 2018

(30) Foreign Application Priority Data
May 22, 2015  (IN) .......................... 2575/CHE/2015

(51) Int. Cl.
*G06F 7/14*       (2006.01)
*G06F 16/25*      (2019.01)
*G06Q 30/02*      (2012.01)

(52) U.S. Cl.
CPC .............. *G06F 7/14* (2013.01); *G06F 16/258* (2019.01); *G06Q 30/0201* (2013.01)

(58) Field of Classification Search
CPC ...... G06F 7/14; G06F 16/258; G06Q 30/0201
See application file for complete search history.

(56) References Cited

U.S. PATENT DOCUMENTS

| 6,594,673 | B1* | 7/2003  | Smith .................. G06F 16/954 |
| 7,210,130 | B2  | 4/2007  | Fairweather |
| 7,617,185 | B2* | 11/2009 | Werner .............. G06F 16/9038 |
| 7,730,085 | B2  | 6/2010  | Hassan et al. |
| 7,809,548 | B2* | 10/2010 | Mihalcea ............... G06F 40/30 704/1 |

(Continued)

OTHER PUBLICATIONS

Das, A., et al., Semantic Approximation of Data Stream Joins, Department of Computer Science, Cornell University, Retrieved from the Internet: < http://citeseerx.ist.psu.edu/viewdoc/download?doi=10.1.1.90.9333&rep=rep1&type=pdf> [retrieved on Jan. 28, 2015], 26 pages.

(Continued)

*Primary Examiner* — Miranda Le

(57) ABSTRACT

Semantic consolidation of data is disclosed. One example is a system including a data processor, a semantic relations module, and a consolidation module. The data processor identifies at least two data objects, each data object including a plurality of data elements. The semantic relations module identifies, via a processor, semantically similar data elements of the plurality of data elements. The consolidation module merges the identified semantically similar data elements via the processor, and generates a consolidated data object based on the merged data elements.

17 Claims, 4 Drawing Sheets

(56) References Cited

U.S. PATENT DOCUMENTS

| | | | |
|---|---|---|---|
| 7,890,649 B2 | 2/2011 | Gu et al. | |
| 8,098,248 B2 | 1/2012 | Feblowitz et al. | |
| 8,407,253 B2* | 3/2013 | Ryu | G06F 16/9024 |
| | | | 707/790 |
| 8,539,510 B2 | 9/2013 | Nesamoney et al. | |
| 8,838,439 B2* | 9/2014 | Butters | G06F 40/295 |
| | | | 704/9 |
| 9,135,240 B2* | 9/2015 | Gliozzo | G06F 40/30 |
| 9,177,248 B2* | 11/2015 | Sweeney | G06N 7/005 |
| 9,336,301 B2* | 5/2016 | Majkowska | G06F 16/35 |
| 9,785,725 B2* | 10/2017 | Srinivasan | G06F 16/248 |
| 2003/0050915 A1* | 3/2003 | Allemang | G06F 16/9024 |
| 2007/0192343 A1* | 8/2007 | Faerber | G06F 16/2453 |
| 2009/0164895 A1* | 6/2009 | Baeza-Yates | G06F 16/3349 |
| | | | 715/700 |
| 2012/0162230 A1* | 6/2012 | Nevin, III | G06F 16/2425 |
| | | | 345/440 |
| 2013/0246342 A1* | 9/2013 | Faith | G06Q 30/06 |
| | | | 707/607 |
| 2014/0040182 A1* | 2/2014 | Gilder | G06Q 40/12 |
| | | | 707/602 |
| 2016/0035114 A1* | 2/2016 | Hesse | G06T 11/206 |
| | | | 345/440 |

OTHER PUBLICATIONS

The technical aspects identified in the present application (Art. 15 PCT) are considered part of common general knowlegde.

Unknown, Spark Streaming Programming Guide, Retrieved from the Internet: < https://spark.apache.org/docs/latest/streaming-programming-guide.html > [retrieved on Jan. 28, 2015], 26 pages.

Wikipedia "Computer". Nov. 2, 2001, XP002747263. Retrived from the internet : URL: https://en.wikipedia.org/w/index.php?title=Computer&oldid=241445.

International Searching Authority., International Search Report and Written Opinion dated Nov. 13, 2015 for PCT Application Application No. PCT/EP2015/071374 Filed Sep. 17, 2015, 10 pages.

* cited by examiner

SEMANTIC CONSOLIDATION OF DATA

BACKGROUND

Data objects are generally utilized for management and analysis of data related to products based on information received from customers and/or enterprises. The data objects may generally include information in structured, unstructured, or semi-structured form. Data objects may include data in a variety of formats, including, text, video, audio, and so forth.

DETAILED DESCRIPTION

Figure 1:
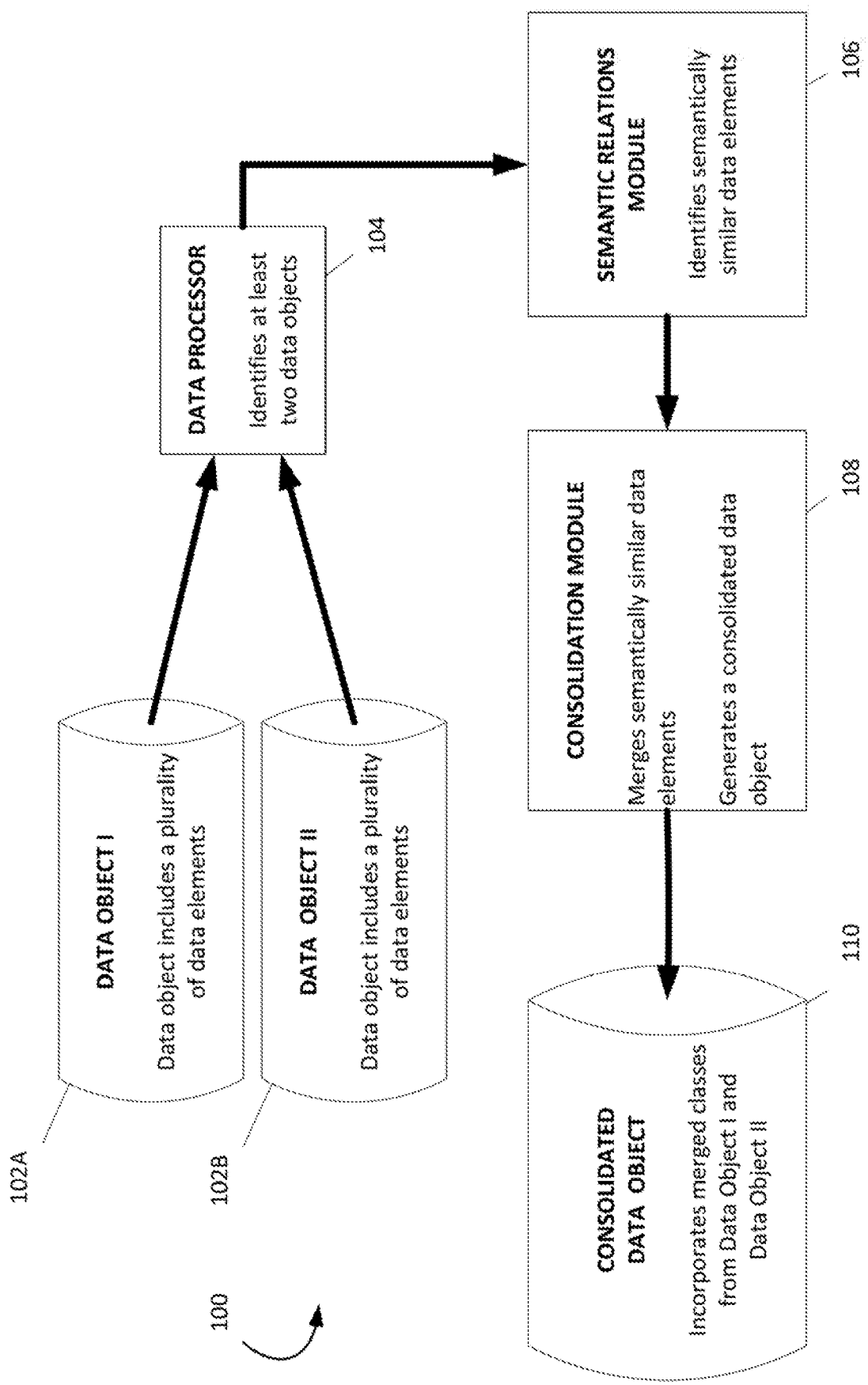
FIG. 1 is a functional block diagram illustrating one example of a system for semantic consolidation of data.

Companies providing products and/or services deploy the products and/or services, and such products and/or services may collect information about various enterprises, users and associated devices. For example, a company may deploy a large fleet of printers and servers at multiple geographically diverse locations. Reports may be generated from such information, and these reports may be utilized for decision making purposes. For example, based on a number of pages printed from a given operating system on a mobile device, a company may decide to invest more on a particular mobile device print application for that given operating system. Also, for example, based on a volume of ink utilized by a given printer model, the company may decide to invest more on a particular printer. Generally, although information may be received and stored, various bits and pieces of information may not be aggregated, and this may result in a loss of comprehensive intelligence related to products and/or services.

Manual data collection and data synthesis leads to scalability limitations. Existing technologies sometimes automate such processes. For example, information available over the internet may be collected and processed to extract user feedback. For example, sentiment analysis may be performed on data retrieved from the internet, and a company may be provided with consumer satisfaction data for a product and/or service based on the sentiment analysis.

In many instances, data collected from various sources may be stored in a data object. The data object may be a structured data object such as a list, a graph, a lookup table, a tree, and so forth. The data object may also be an unstructured data object such as log messages. The data object may include data in a variety of formats, including text, video, audio, mixed format, and so forth. Although information from individual data objects may be generally available for analysis, existing technologies do not provide a means to collate and combine data from multiple data objects. For example, data related to Product A may be stored in multiple graphs. Such multiple graphs may be consolidated into a single graph by identifying semantically similar contents in the data objects, and by merging the information associated with the semantically similar contents. Such consolidation of data may provide valuable insights about existing data and/or information.

As described herein, data related to individual products may be collated and semantically joined. Such data may include information from multiple data repositories (both internal and external to an enterprise). A consolidated multi-dimensional graph may be generated. Related data elements of data may be identified, and a "semantic join" of the data elements, attributes and/or relationships may be performed to generate a converged model representing the combined data model and/or graph. For simplicity of exposition, the description herein refers to a graph as a representation model. Such graphs are generally multi-dimensional. However, the techniques described herein are applicable to a variety of data objects, such as, for example, two-dimensional trees.

As described in various examples herein, semantic consolidation of data is disclosed. One example is a system including a data processor, a semantic relations module, and a consolidation module. The data processor identifies at least two data objects, each data object including a plurality of data elements. The semantic relations module identifies, via a processor, semantically similar data elements of the plurality of data elements. The consolidation module merges the identified semantically similar data elements via the processor, and generates a consolidated data object based on the merged data elements.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for semantic consolidation of data. System 100 includes a data processor 104, a semantic relations module 106, and a consolidation module 108. The data processor 104 may be communicatively linked to multiple data repositories. For example, data processor 104 may receive data from data repositories associated with multiple enterprise clients that deploy fleets of printers and/or servers. The received data may include information related to product usage, model, age, defects, performance issues, issue resolutions, and so forth. For example, the received data may include data related to a particular model of a printer, and may indicate an amount of toner used and/or a number of pages printed. As another example, data processor 104 may receive data from data repositories associated with multiple enterprise clients that deploy fleets of laptops and desktops. Such data may include IP addresses, geographic locations, a number of print jobs sent from a particular laptop model, security log messages related to laptops that connect to a particular server, and so forth. Also, for example, data processor 104 may receive data from data repositories associated with multiple individual consumers that own various products. For example, a user may own a laptop, mobile device, and a printer, and the received data may relate to performance of such products, connectivity data, data retrieved via cookies, and so forth.

The data processor 104 identifies at least two data objects, such as Data Object I 102A and Data Object II 102B, where each data object includes a plurality of data elements. The term "data object" as used herein, generally refers to a collection of data. In some examples, the data object may be in structured form. For example, the data object may be a linked database, a tabular array, an excel worksheet, a graph, a tree, and so forth. In some examples, the data object may be unstructured. For example, the data object may be a collection of log messages, snippets from text messages, messages from social networking platforms, and so forth. In some examples, the data object may be in semi-structured form.

The term "data elements" as used herein generally refers to any data included in a data object. For example, the data object may be a graph, and the data elements may be nodes in the graph that represent information related to a product and/or service. Also, for example, the data object may be a tree, and the data elements may be leaves of the tree that represent information related to a product and/or service. As another example, the data object may be a collection of log messages from a specified range of IP addresses, and the data elements may be the log messages. Also, for example, the data object may be a collection of service resolutions, and the data elements may be text messages representative of the service resolutions.

In some examples, the data elements may also be any metadata related to a data object. For example, the data elements may be timestamp data related to log messages in a collection of log messages. As another example, the data object may be a matrix, and the data elements may be high-dimensional vectors representative of product data. In some examples, the data object may be a stream of data, and the data elements may be data in the stream of data. For example, the data object may be a stream of real-time data from a service call center. As another example, the data object may be a stream of real-time data related connectivity parameters of laptop and/or mobile devices located in a specified geographical location. Generally, data elements may be in a variety of different data formats. For example, the data may be textual data, including numeric and/or non-numeric data, video data, image data, audio data, and/or data in mixed format.

In some examples, the data processor 104 may identify a data object of the at least two data objects based on prior knowledge. For example, the data object may be associated with a range of IP addresses. As another example, the data object may be associated with a specified geographical location. Also, for example, the data object may be associated with an enterprise customer, a product, a model, a year of manufacture, an individual consumer, and so forth. In some examples, the data processor 104 may dynamically identify a data object of the at least two data objects. For example, the data object may be representative of information from a sensor, and the sensor may be identified dynamically.

In some examples, the data processor 104 may convert a given data element into sub-units of data. In some examples, the sub-units of data may include one of an n-gram, keyword, key phrase, video clip, and audio clip. For example, the given data element may be tokenized, where each token is a string term, that may have proper word boundaries. For example, the given data element may be parsed into keywords and/or key phrases. Also, for example, n-grams may be extracted from the given data element. For example, "serial number" is a bi-gram, and may be considered as one token/term.

In some examples, the data processor 104 may process the data objects and generate structured data from unstructured data. For example, the data processor 104 may receive a collection of log messages, extract information including timestamp data, source data, keywords and/or key phrases, n-grams, video clips, audio clips, etc. from the collection, and generate a structured data set, for example, a matrix that includes such extracted information.

In some examples, the data processor 104 may identify a plurality of attributes associated with a data element. As used herein, an attribute may be any property and/or identifier associated with a data element. For example, the data element may be a "printer", and the printer's "name" and "description" may be attributes of the printer. As another example, the data element may be "printerinfo", and the "name", "make", "serial number", and "job information" may be attributes associated with the printerinfo.

In some examples, the data processor 104 may identify relationships between the plurality of data elements. As used herein, the term relationship may generally refer to a functional and/or relational connection between data elements. For example, a first data element may be a laptop, and a second data element may be a printer, and a relationship between the two data elements may be that the laptop sends a print request to the printer. In some examples, the data object may be a graph, and the laptop and printer may be represented by nodes on the graph, and the relationship between the laptop and the printer may be represented by an arrow originating at the node representing the laptop and terminating at the node representing the printer. In some examples, there may be no relationship between two given data elements. For example, a mobile device may not be connected to a printer, and consequently there may be no relationship between the mobile device and the printer.

The semantic relations module 106 may identify, via a processor, semantically similar data elements of the plurality of data elements. The term "semantically similar" generally refers to similar in meaning. Semantic similarity may be generally utilized to measure proximity between two data elements based on a likeness of their respective meanings, and/or their semantic content. Semantic similarity may be based on a relation between words, phrases, signs, symbols, and their respective meanings. For example, the terms "printer" and "printinfo" may be determined to be semantically similar as they refer to properties and/or attributes of a printer. In some examples, contextual information may be incorporated into system 100 to identify semantically similar data elements. In some examples, semantic similarity may be determined based on a relation between terms and/or concepts. For example, text in an unstructured data object may be parsed, and a grammar tree may be generated based on the parsed text. Terms may be determined to be semantically similar based on a length of a path between the terms in the grammar tree. A shorter path may be indicative of greater semantic similarity between the terms. Also, for example, various statistical models may be utilized to measure semantic similarity between data elements.

In some examples, the semantic relations module 106 may identify the semantically similar data elements based on semantic relatedness scores for pairs of data elements. Generally, the semantic relatedness score may be a quantitative measure of a degree of semantic similarity between two data elements. For example, the semantic relatedness score may be the length of a path between terms in a grammar tree. In some examples, when a data element is represented as a vector, the semantic relatedness score may be a number of overlaps between two vectors.

For example, the data processor 104 may identify all information available about a first data element A, and a second data element B. For each data element, names, descriptions, comments, and so forth may be retrieved from information repositories. In some examples, such information may be parsed into sub-units of data. For example, the information may be converted into tokens that are suitable for data processing. For example, each token may be a string term that has proper word boundaries. N-gram representations may be utilized as well. The semantic relations module 106 may compare the tokens and determine a number of matches. Matches for strings, as well as sub-strings, may be identified. For example, a data element "printer" in one product and a data element "printinfo" in another product may be identified as semantically similar. The semantic relations module 106 may determine the semantic relatedness score based on a number of tokens that match.

In some examples, the semantic relations module 106 identifies two data elements as similar if the respective semantic relatedness score exceeds a threshold. For example, if the semantic relatedness score is above a 60% confidence level, then the semantic relations module 106 may identify the two data elements as semantically similar. Also, for example, if the semantic relatedness score is below a 50% confidence level, then the semantic relations module 106 may identify the two data elements as not semantically similar.

The consolidation module 108 may merge the identified semantically similar data elements via the processor, and generate a consolidated data object based on the merged data elements. For example, the semantic relations module 106 may identify two data elements A and C as semantically similar. Accordingly, the consolidation module 108 may merge the two data elements A and C to form a new data element D, a semantic join of A and C.

In some examples, the consolidation module 108 may merge the respective plurality of attributes associated with the semantically similar data elements. For example, a converged attribute list for the two semantically similar data elements may be generated. For example, A may represent "Printer", with attributes "name" and "type" in a particular product, and C may represent "Printer class" with attributes "name", "job" and "inventory levels". The consolidation module 108 may merge the two data elements to form a data element D that represents "Printer class" with attributes "name", "type", "job" and "inventory levels".

In some examples, the consolidation module 108 may generate the consolidated data object based on merging relationships associated with the semantically similar data elements. In some examples, the data objects may be graphs, and data elements may be represented by nodes on the graphs. The edges of the graph may represent relationships between the nodes. For example, data element A in the first graph may be related to data elements M and N, whereas data element C in the second graph may be related to data elements X, Y, and Z. Accordingly, when data elements A and C are merged to form a new data element D in the consolidated graph, the new data element D may be determined to be related to data elements M, N, X, Y, and Z.

Generally, the consolidation module 108 may hierarchically perform merge operations, starting with a data element, then its associated attributes, and then the associated relationships. When the data object is a graph, identification of semantic similarity and merge operations may be performed in tandem, beginning at a node, and traversing the graph from one node to another.

For example, data processor 104 may identify a first data object, a second data object and a third data object. The first data object, say Data Object I 102A may include three data elements $A_1, A_2, A_3$. Each data element may be associated with attributes. For example, data element $A_1$ may be associated with attributes $A_1.t_1, A_1.t_2$, and so forth. Likewise, a second data object, say Data Object II 102B may include data elements $B_1, B_2, B_3$, and so forth. Each data element may be associated with attributes. For example, data element $B_1$ may be associated with attributes $B_1.t_1, B_1.t_2$, and so forth. Similarly, a third data object may include data elements $C_1, C_2, C_3$, and so forth. Each data element may be associated with attributes. For example, data element $C_1$ may be associated with attributes $C_1.t_1, C_1.t_2$, and so forth.

In some examples, the semantic relations module 106 may identify semantically similar data elements. For example, the semantic relations module 106 may identify that data elements $A_1$ and $C_1$ are semantically similar. Accordingly, the consolidation module 108 may merge the data elements $A_1$ and $C_1$ to form a new data element $D_1$. Next, the consolidation module 108 may merge the respective attributes $A_1.t_1, A_1.t_2, C_1.t_1, C_1.t_2$, and so forth, and associate the new data element $D_1$ with these attributes. In some examples, the consolidation module 108 may merge the relationships associated with $A_1$ and $C_1$ to form relationships for the new data element $D_1$.

In some examples, the consolidation module 108 may provide the consolidated data object to a computing device via an interactive graphical user interface. For example, the consolidation module 108 may provide a consolidated graph as an interactive object. Nodes and edges of the graph may be selectable. For example, selecting a first node and a second node may provide all relationships between the two nodes. Also, for example, selecting a node may provide a list of attributes and relationships associated with the node. Since information represented in the consolidated graph is aggregated, selecting a node may trigger system 100 to provide the aggregated information.

The components of system 100 may be computing resources, each including a suitable combination of a physical computing device, a virtual computing device, a network, software, a cloud infrastructure, a hybrid cloud infrastructure that may include a first cloud infrastructure and a second cloud infrastructure that is different from the first cloud infrastructure, and so forth. The components of system 100 may be a combination of hardware and programming for performing a designated visualization function. In some instances, each component may include a processor and a memory, while programming code is stored on that memory and executable by a processor to perform a designated function.

For example, the semantic relations module 106 may be a combination of hardware and programming to identify semantically similar data elements of the plurality of data elements. Also, for example, the semantic relations module 106 may include software programming to determine semantic relatedness scores. For example, the semantic relations module 106 may include programming to determine a number of matching tokens in tokenized data. The semantic relations module 106 may include hardware to physically store, for example, such determined quantities, and/or maintain a dynamically updated database that stores the semantically similar data elements that have been identified.

Likewise, the consolidation module 108 may be a combination of hardware and programming to merge the identified semantically similar data elements. Also, for example, the consolidation module 108 may include programming to generate a consolidated data object based on the merged data elements. The consolidation module 108 may include hardware to physically store, for example, the consolidated data object. Also, for example, the consolidation module 108 may include software programming to dynamically interact with the other components of system 100.

Generally, the components of system 100 may include programming and/or physical networks to be communicatively linked to other components of system 100. In some instances, the components of system 100 may include a processor and a memory, while programming code is stored and on that memory and executable by a processor to perform designated functions.

A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 2:
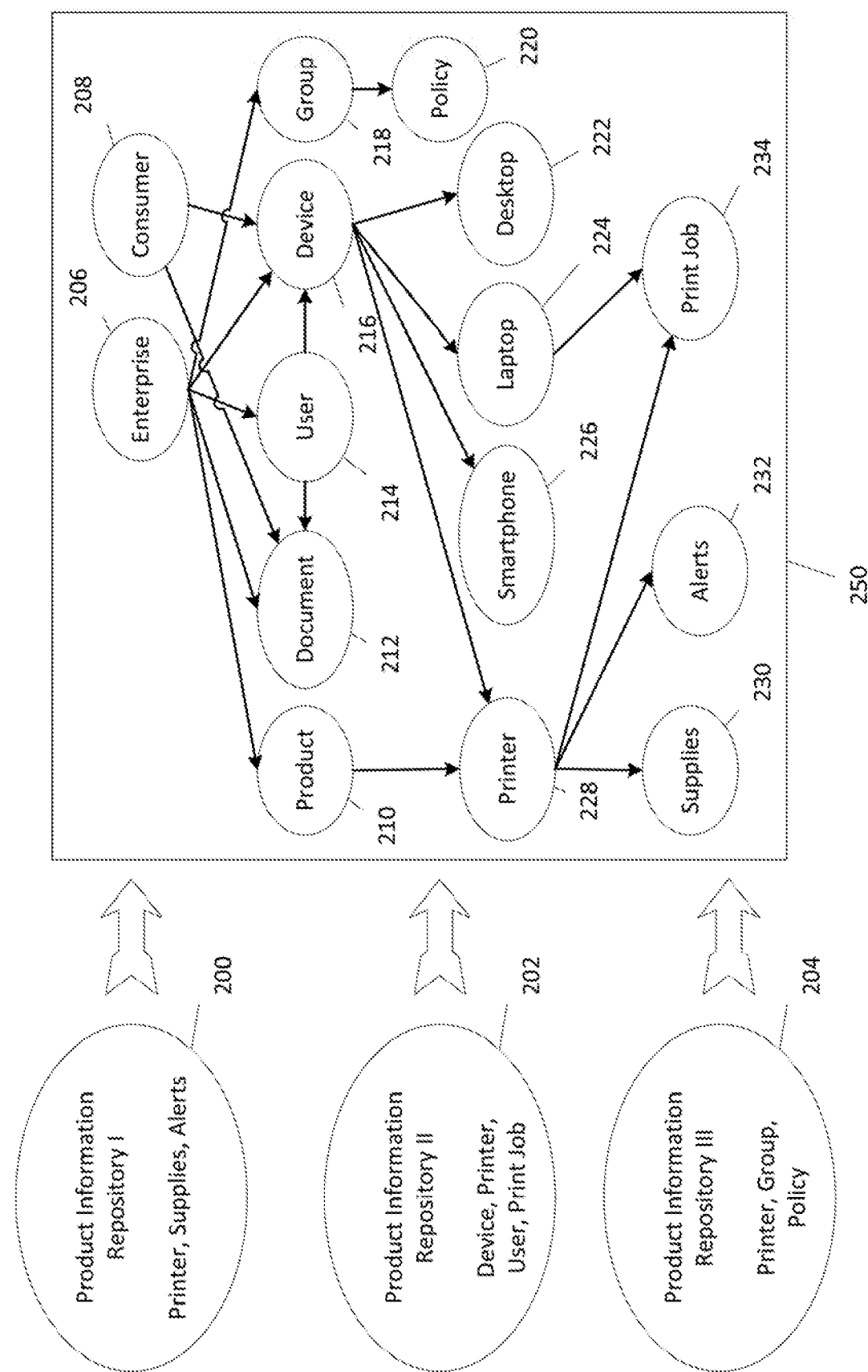
FIG. 2 illustrates one example of merging data elements to generate a consolidated data object.

FIG. 2 illustrates one example of merging data elements to generate a consolidated data object. As described herein, data and/or information may be received from a plurality of data objects. For example, a Product Information Repository I 200 may include data related to "Printer", "Supplies", and "Alerts". For example, Product Information Repository I 200 may include information that certain printers listed in "Printer" have the supplies listed in "Supplies", and generate alerts listed in "Alerts".

Also, for example, Product Information Repository II 202 may include data related to "Device", "Printer", "User", and "Print Job". For example, Product Information Repository II 202 may include information that a certain device, for example, a laptop, requests a "Print Job", that printers listed in "Printer" have the requested "Print Job" in their printing queue, and that the users listed in "User" own devices listed in "Device", for example, a smartphone, a laptop, a desktop, and a printer.

As another example, Product Information Repository III 204 may include data related to "Printer", "Group", and "Policy". For example, Product Information Repository III 204 may include information that printers listed in "Printer" have a requested "Print Job" in their printing queue, and that groups listed in "Group" have policies listed in "Policy".

A consolidated data object, such as a consolidated graph 250 may be generated to merge the information and/or data from the Product Information Repository I 200, Product Information Repository II 202, and Product Information Repository III 204. For example, information may be received from an Enterprise 206 and a Consumer 208. Enterprise 206 may be any large enterprise that deploys, for example, a fleet of computing devices. Such a deployment may span multiple countries. For example, Enterprise 206 may collect information related to data elements and after appropriate depersonalization of such information, it may be uploaded onto a cloud server. Such anonymous data may be stored in data pools. Enterprise 206 may benefit from insights obtained from aggregated data from all its deployed devices.

Consumer 208 may be an individual, a small, and/or medium business. For example, Consumer 208 may be an owner of a plurality of computing devices. Data from such devices may be collected via data agents and/or data collectors, and may be uploaded to a consumer data pool, after references to specific individuals are removed, and data is appropriately depersonalized. Consumer 208 may benefit from insights obtained from data aggregated from all the computing devices.

Also, for example, information may be collected from the internet. For example, web crawling engines may crawl the internet to extract data related to products and/or services from internet data repositories. Such data may be extracted from online blogs, web sites, web pages, and so forth, and the collected data may be stored in a web data pool.

As described herein, such data from the cloud data pools, consumer data pools and/or web data pools may be consolidated. For example, a multi-dimensional graph may be generated based on the data pools. In some examples, such data may be associated with weights based on a source of the data. In some examples, data processor 104 may perform graph traversals of such a graph and extract information that may be relevant for further processing. For example, a semantic extractor may be utilized to extract insights that may be pertinent to customers.

In some examples, Enterprise 206 may have a Product 210, such as a Printer 228, a Document 212, a User 214, a Device 216, and may own a Group 218 with applicable Policy 220. The information related to Printer 228 may include information about Supplies 230 that Printer 228 has, and Alerts 232 that are generated by the Printer 228. Also, for example, Printer 228 may spool Print Job 234. In some examples, the User 214 may create Document 212. In some examples, User 214 in Enterprise 206 and Consumer 208 may own Device 216. Device 216 may be at least one of a Printer 228, a Smartphone 226, a Laptop 224, and a Desktop 222. In some examples, Laptop 224 may request a Print Job 234.

Arrows in the consolidated graph 250 represent relationships between data elements and/or attributes. As described herein, information related to Printer 228 may be received from the Product Information Repository I 200, Product Information Repository II 202, and Product Information Repository III 204. Such information may be aggregated in the consolidated graph 250. For example, Product Information Repository I 200 may provide data that Printer 228 is related to Alerts 232 and Supplies 230, and Product Information Repository II 202 may provide data that Printer 228 is related to Print Job 234. Accordingly, in the consolidated graph 250, Printer 228 is related to Alerts 232, Supplies 230, and Print Job 234. Likewise, Product Information Repository II 202 may provide data that Laptop 224 requests Print Job 234. Such data may be aggregated with the fact that Printer 228 also requests Print Job 234.

Figure 3:
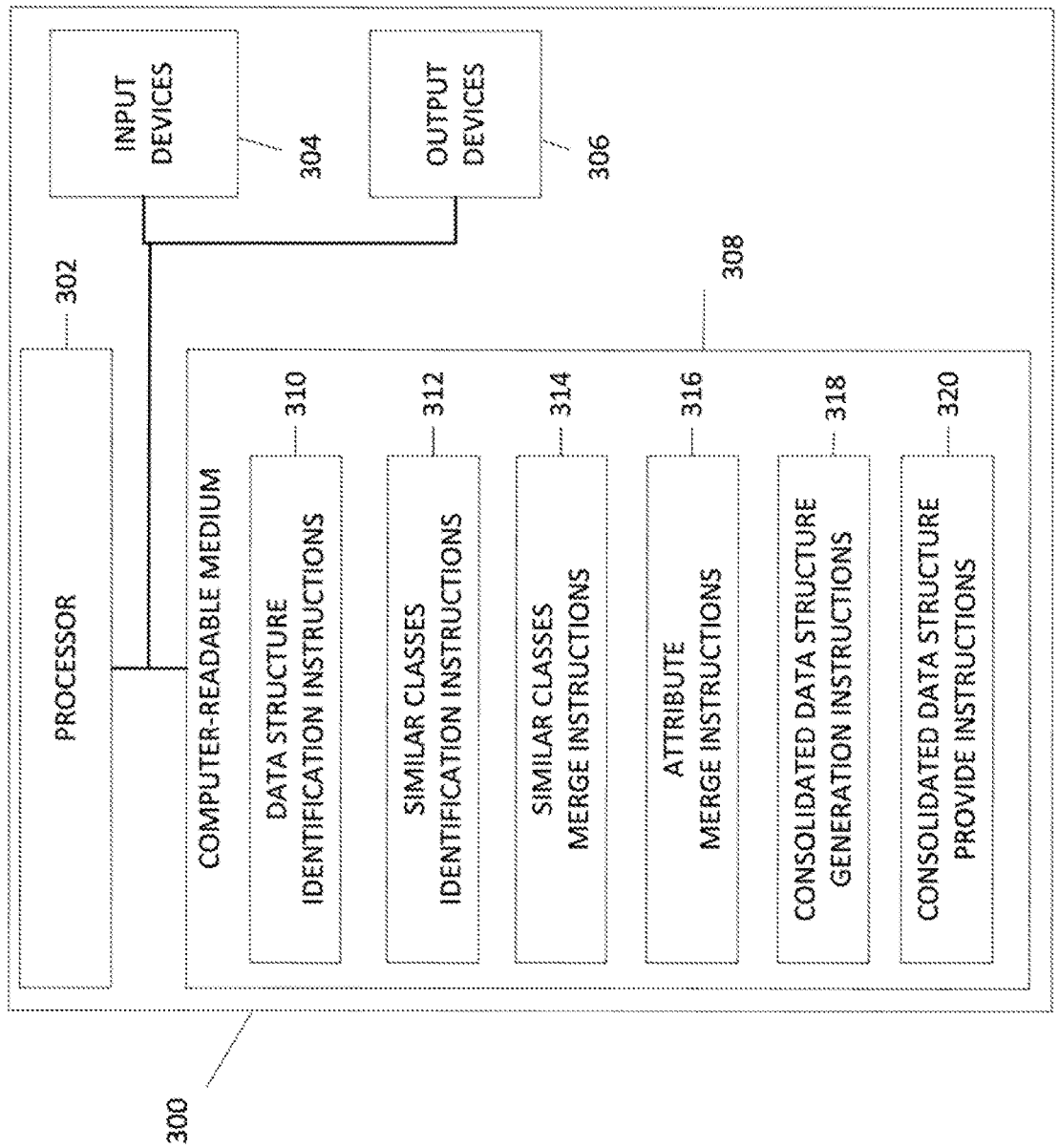
FIG. 3 is a block diagram illustrating one example of a computer readable medium for semantic consolidation of data.

FIG. 3 is a block diagram illustrating one example of a computer readable medium for semantic consolidation of data. Processing system 300 includes a processor 302, a computer readable medium 308, input devices 304, and output devices 306. Processor 302, computer readable medium 308, input devices 304, and output devices 306 are coupled to each other through a communication link (e.g., a bus).

Processor 302 executes instructions included in the computer readable medium 308. Computer readable medium 308 includes data object identification instructions 310 to identify at least two data objects, each data object including a plurality of data elements, and each data element associated with a plurality of attributes.

Computer readable medium 308 includes similarity data elements identification instructions 312 to identify semantically similar data elements of the plurality of data elements.

Computer readable medium 308 includes similarity data elements merge instructions 314 to merge the identified semantically similar data elements.

Computer readable medium 308 includes attribute merge instructions 316 to merge the respective plurality of attributes associated with the identified semantically similar data elements.

Computer readable medium 308 includes consolidated data object generation instructions 318 to generate a consolidated data object based on the merged data elements and the merged attributes.

Computer readable medium 308 includes consolidated data object provide instructions 320 to provide the consolidated data object to a computing device via an interactive graphical user interface.

In some examples, the similarity data elements identification instructions 312 include instructions to identify relationships between the plurality of data elements of each data object, and wherein the consolidated data object generation instructions 318 include instructions to merge the identified relationships in the generated consolidated data object.

Input devices 304 include a keyboard, mouse, data ports, and/or other suitable devices for inputting information into processing system 300. In some examples, input devices 304, such as a computing device, are used to receive the at least two data objects. Output devices 306 include a monitor, speakers, data ports, and/or other suitable devices for outputting information from processing system 300. In some examples, output devices 306 are used to provide the consolidated data object.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 308 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 300 are identified and refer to a combination of hardware and programming configured to perform a designated visualization function. As illustrated in FIG. 3, the programming may be processor executable instructions stored on tangible computer readable medium 308, and the hardware may include processor 302 for executing those instructions. Thus, computer readable medium 308 may store program instructions that, when executed by processor 302, implement the various components of the processing system 300.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 308 may be any of a number of memory components capable of storing instructions that can be executed by Processor 302. Computer readable medium 308 may be non-transitory in the sense that it does not encompass a transitory signal but instead is made up of one or more memory components configured to store the relevant instructions. Computer readable medium 308 may be implemented in a single device or distributed across devices. Likewise, processor 302 represents any number of processors capable of executing instructions stored by computer readable medium 308. Processor 302 may be integrated in a single device or distributed across devices. Further, computer readable medium 308 may be fully or partially integrated in the same device as processor 302 (as illustrated), or it may be separate but accessible to that device and processor 302. In some examples, computer readable medium 308 may be a machine-readable storage medium.

Figure 4:
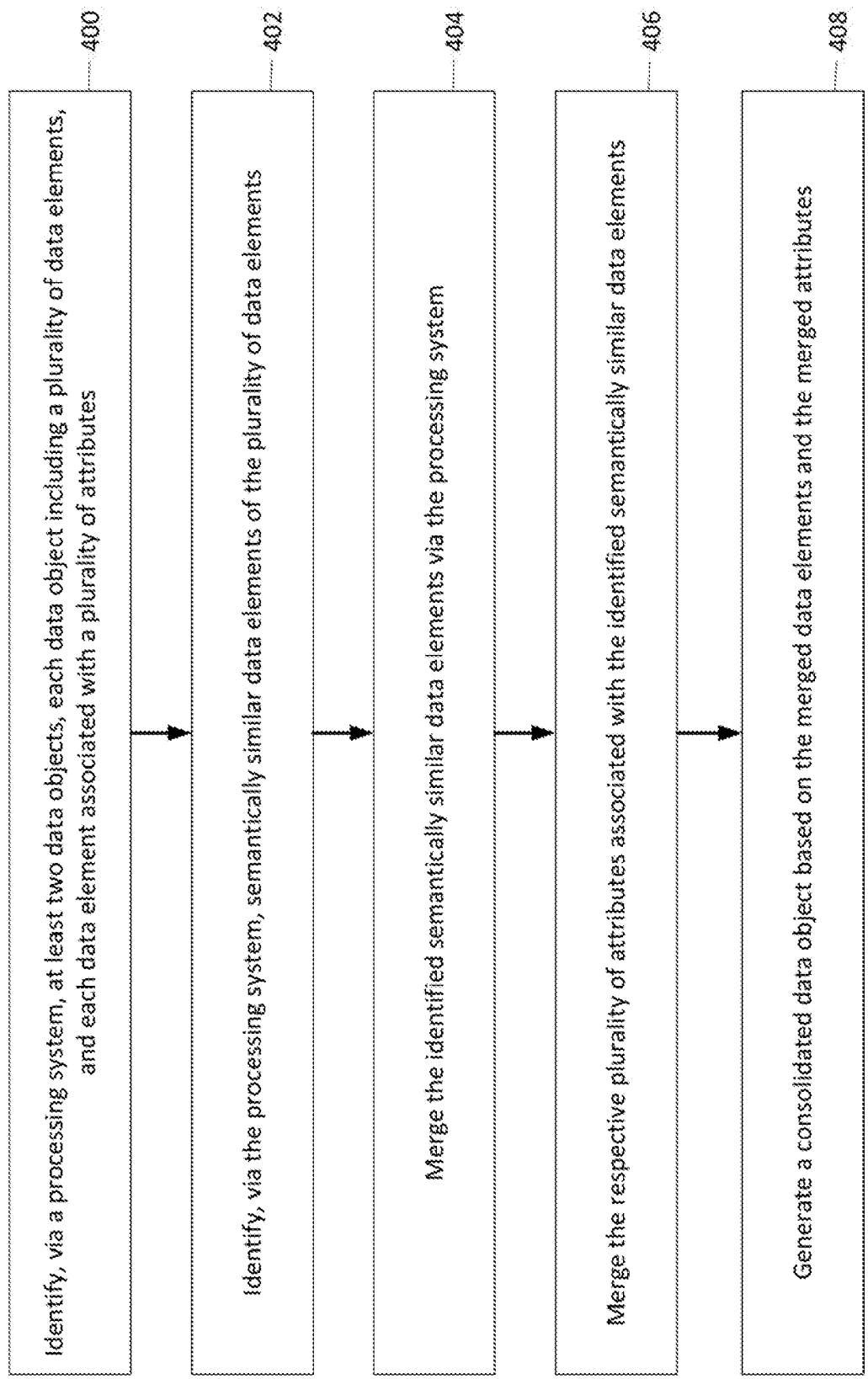
FIG. 4 is a flow diagram illustrating one example of a method for semantic consolidation of data.

FIG. 4 is a flow diagram illustrating one example of a method for semantic consolidation of data. In some examples, such an example method may be implemented by a system such as, for example, system 100 of FIG. 1.

At 400, at least two data objects may be identified via a processing system, each data object including a plurality of data elements, and each data element associated with a plurality of attributes.

At 402, semantically similar data elements of the plurality of data elements may be identified via the processing system.

At 404, the identified semantically similar data elements may be merged via the processor.

At 406, respective plurality of attributes associated with the identified semantically similar data elements may be merged.

At 408, a consolidated data object may be generated based on the merged data elements and the merged attributes.

In some examples, the method may further include identifying the semantically similar data elements based on semantic relatedness scores for pairs of data elements. In some examples, the method may further include identifying two data elements as similar if the respective semantic relatedness score exceeds a threshold.

In some examples, the method may further include identifying relationships between the plurality of data elements of each data object, and wherein the consolidated data object may be generated by merging relationships associated with the semantically similar data elements.

In some examples, the method may further include converting a given data element into sub-units of data. In some examples, the sub-units of data include one of an n-gram, keyword, key phrase, video clip, and audio clip In some examples, the data object may be a graph, and the data elements may be nodes of the graph.

Examples of the disclosure provide a generalized system for semantic consolidation of data. The generalized system allows scalable and accurate creation of a consolidated data object that incorporates data from diverse enterprises and/or consumers in a computationally feasible manner. Generating the consolidated data object goes beyond syntactic relations to incorporate semantic relations of the data elements and/or attributes. Accordingly, related data elements that have different labels may be identified based on semantic similarity.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a data processor to identify at least two data graphs, each of the at least two data graphs including a plurality of data nodes, and each data node of the plurality of data nodes being associated with a plurality of attributes;
a semantic relations module to identify, via a processor, semantically similar data nodes of the at least two data graphs, wherein the semantic relations module is to identify the semantically similar data nodes based on semantic relatedness scores for pairs of data nodes; and
a consolidation module to:
merge the identified semantically similar data nodes of the at least two data graphs via the processor,
merge the respective plurality of attributes associated with the identified semantically similar data nodes of the at least two data graphs,
generate a consolidated data graph including the merged identified semantically similar data nodes and the merged respective plurality of attributes, and
cause to display, in an interactive graphical user interface of a computing device, the consolidated data graph comprising data nodes and edges that are selectable via the interactive graphical user interface.

2. The system of claim 1, wherein the semantic relations module identifies two data nodes as similar if an associated semantic relatedness score exceeds a threshold.

3. The system of claim 1, wherein the semantic relations module:
parses text of at least two unstructured data objects,
generates a grammar tree based on the parsed text of the at least two unstructured data objects, and
determines semantic relatedness scores for pairs of terms of the generated grammar tree based on lengths of paths between the pairs of terms in the generated grammar tree.

4. The system of claim 1, wherein the data processor further identifies relationships between the plurality of data nodes, and the consolidation module further generates the consolidated data graph based on merging relationships associated with the semantically similar data nodes.

5. The system of claim 4, wherein the consolidation module:
merges the respective plurality of attributes after merging the identified semantically similar data nodes, and
merges the relationships after merging the respective plurality of attributes.

6. The system of claim 1, wherein each data node of the plurality of data nodes is associated with a particular product or service.

7. The system of claim 6, wherein the data processor performs identification of semantic similarity and merges operations in tandem for each data node.

8. A method comprising:
identifying, via a processing system, at least two data graphs, each data graph of the at least two data graphs including a plurality of data nodes, and each data node of the plurality of data nodes being associated with a plurality of attributes;
identifying, via the processing system, semantically similar data nodes of the at least two data graphs;
identifying the semantically similar data nodes based on a number of tokens that match, wherein the data nodes comprise the number of tokens that match;
merging the identified semantically similar data nodes of the at least two data graphs via the processing system;
merging the respective plurality of attributes associated with the identified semantically similar data nodes of the at least two data graphs;
generating a consolidated data graph including the merged identified semantically similar data nodes and the merged respective plurality of attributes; and
causing to display, in an interactive graphical user interface of a computing device, the consolidated data graph comprising data nodes and edges that are selectable via the interactive graphical user interface.

9. The method of claim 8, further comprising identifying the semantically similar data nodes based on a length of a path between pairs of terms in a grammar tree, wherein the grammar tree is generated based on parsed text from at least one of the at least two data graphs.

10. The method of claim 9, further comprising:
identifying the semantically similar data nodes based on semantic relatedness scores for pairs of data nodes,
parsing text of at least two unstructured data objects,
generating a grammar tree based on the parsed text of the at least two unstructured data objects, and
determining semantic relatedness scores for pairs of terms of the generated grammar tree based on lengths of paths between the pairs of terms in the generated grammar tree.

11. The method of claim 8, further comprising identifying the semantically similar data nodes based on a number of overlaps between two vectors, wherein each vector represents a data node.

12. The method of claim 8, further comprising:
generating a converged attribute list for at least two of the identified semantically similar data nodes.

13. A non-transitory computer readable medium comprising executable instructions to:
identify, via a processor, at least two data graphs, each data graph of the at least two data graphs including a plurality of data nodes, and each data node of the plurality of data nodes being associated with a plurality of attributes;
identify, via the processor, semantically similar data nodes of the at least two data graphs;
identify, via the processor, the semantically similar data nodes based on semantic relatedness scores for pairs of data nodes;
merge the identified semantically similar data nodes of the at least two data graphs via the processor;
merge the respective plurality of attributes associated with the identified semantically similar data nodes of the at least two data graphs;
generate a consolidated data graph including the merged identified semantically similar data nodes and the merged respective plurality of attributes; and
cause to display, in an interactive graphical user interface of a computing device, the consolidated data graph comprising data nodes and edges that are selectable via the interactive graphical user interface.

14. The non-transitory computer readable medium of claim 13, comprising executable instructions to:
  parse text of at least two unstructured data objects,
  generate a grammar tree based on the parsed text of the at least two unstructured data objects, and
  determine semantic relatedness scores for pairs of terms of the generated grammar tree based on lengths of paths between the pairs of terms in the generated grammar tree.

15. The non-transitory computer readable medium of claim 13, comprising executable instructions to:
  identify relationships between the plurality of data nodes, and
  generate the consolidated data graph based on merging relationships associated with the semantically similar data nodes.

16. The non-transitory computer readable medium of claim 15, comprising executable instructions to:
  merge the respective plurality of attributes after merging the identified semantically similar data nodes, and
  merge the relationships after merging the respective plurality of attributes.

17. The non-transitory computer readable medium of claim 13, wherein each data node of the plurality of data nodes is associated with a particular product or service.

\* \* \* \* \*